US006883119B1

United States Patent
Bette et al.

(12) United States Patent
(10) Patent No.: US 6,883,119 B1
(45) Date of Patent: Apr. 19, 2005

(54) METHODS OF PROACTIVE NETWORK MAINTENANCE BY AUTOMATIC CREATION OF TROUBLE TICKETS

(75) Inventors: Paul Bette, New Egypt, NJ (US); Harold Guardo, Stanton, NJ (US); Monowar Hossain, Middletown, NJ (US)

(73) Assignee: AT&T Corp., New York, NY (US)

( * ) Notice: Subject to any disclaimer, the term of this patent is extended or adjusted under 35 U.S.C. 154(b) by 574 days.

(21) Appl. No.: 10/007,832

(22) Filed: Nov. 5, 2001

(51) Int. Cl.[7] .............................................. G06F 11/30
(52) U.S. Cl. ................... 714/43; 714/48; 714/4
(58) Field of Search ............................... 714/43, 4, 48; 709/224

(56) References Cited

U.S. PATENT DOCUMENTS 6,181,679 B1 * 1/2001 Ashton et al. ............... 370/244
6,636,486 B1 * 10/2003 Magloughlin ............... 370/252
6,813,634 B1 * 11/2004 Ahmed ........................ 709/224
2002/0087680 A1 * 7/2002 Cerami et al. ............... 709/224
2003/0149919 A1 * 8/2003 Greenwald et al. ........... 714/43

* cited by examiner

*Primary Examiner*—Robert Beausoliel
*Assistant Examiner*—Anne L. Damiano

(57) ABSTRACT

Methods of automatically generating trouble tickets for network elements which are in failure and affecting network performance. The network elements are sectionalized into their basic components so that the failure in the elements can be localized and diagnosed. Once the failure has been diagnosed, a trouble ticket is automatically generated my network maintenance so that the repair of the element can be scheduled and undertaken. The trouble tickets are made available via the network to customers that are concerned that circuits on which they operate and which may be malfunctioning due to the network element failure can be kept informed of the status of the repair and the failure.

7 Claims, 3 Drawing Sheets

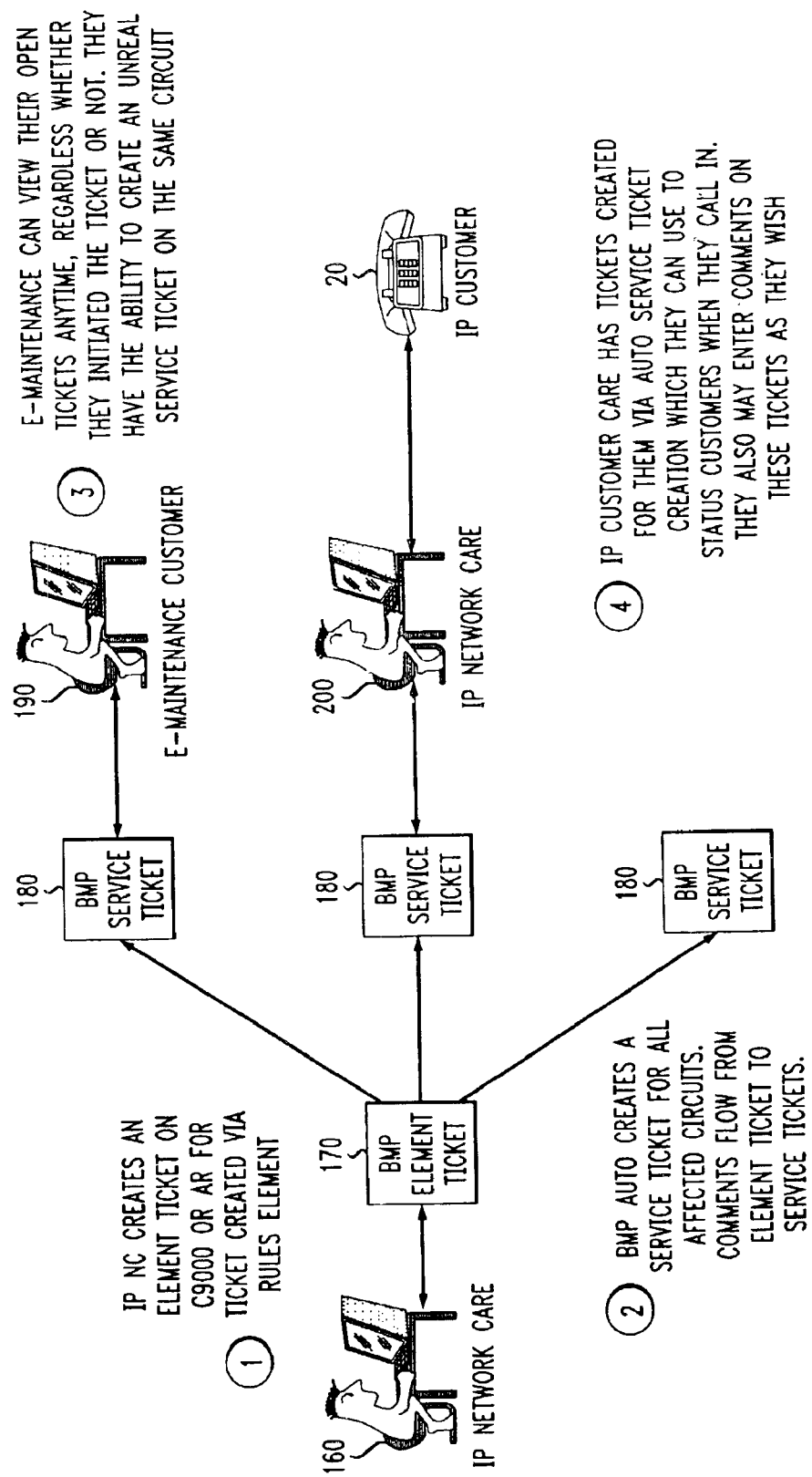

US 6,883,119 B1

METHODS OF PROACTIVE NETWORK MAINTENANCE BY AUTOMATIC CREATION OF TROUBLE TICKETS

BACKGROUND OF THE INVENTION

1. Field of the Invention

This invention relates generally to detecting and documenting network failures. More specifically, the invention relates to methods for automatically creating trouble tickets when network elements fail based on the relationship of a customer service outage or service ticket to a higher-level network element failure.

2. Description of the Related Art

Modem telecommunications networks comprise many complex parts and elements such as servers, computers, switches, routers and optical devices. As will be appreciated, these elements contain complex electronics and processors which are prone to failure in certain circumstances. When such failures occur, service is often interrupted to the customer and the network will generally not perform to acceptable standards. It is imperative that theses failures be diagnosed early and understood so that they may be repaired expeditiously and the network restored.

When network failures occur, customers are often left in the dark regarding the type of failure that has caused the problem and the time that it will take to repair the failure and bring the network, or at least the particular circuits that the customers use, back on line. In this situation, customers typically attempt to contact the network manager to ascertain the problem and time to fix the problem, and if there is a system level failure, the network management can be overwhelmed with customer contacts, particularly telephone calls, inquiring of the status of the network and questioning the network's management about the nature of the problem.

There is therefore a long-felt need in the art for methods of diagnosing and documenting network element failures. Heretofore, there has not been an automatic method of creating a documented, trouble-ticketing regime and customers have not been provided with adequate information regarding the network's failures. There is thus also a long-felt need in the art for network failure ticketing methods that provide a customer with access to information regarding the network failure without unduly burdening network management. Such needs have not heretofore been fulfilled in the art.

SUMMARY OF THE INVENTION

The aforementioned long-felt needs are met, and problems solved, by methods of documenting network failures provided in accordance with the present invention. In a preferred embodiment, components which may fail in the network are defined and associated with user or customer nodes in the network. When a component, or portion of a component fails, a trouble ticket is automatically created based on the association of the components with the customer nodes. In this manner, an automated trouble ticket is generated which will document the problems that the customer is experiencing with the network. As is known by those with skill in the art, and as used herein, a "trouble ticket" is a document, electronic or otherwise, that tabulates and documents a problem or failure with the an element in the network. A trouble ticket may be generated by a user or customer calling in to report trouble with an element in the network, or may be generated when network diagnostic tools detect a failure or other type of problem with a network element.

In a further preferred embodiment, the trouble tickets are placed on a server so that they may be viewed by network maintenance personnel and dealt with accordingly. More preferably, the server is accessible through an Intranet, the Internet, a local area network (LAN), wide area network (WAN) or some other network media. It will be generally desirable to provide customers with access to trouble tickets on the server through the network so that the customers can simply view the status of the trouble ticket and how the network maintenance personnel plan to deal with the problems associated with the trouble ticket.

In this fashion the methods of the present invention automatically document network failures and other problems with network elements and components. The generation of trouble tickets in accordance with the invention will allow the network diagnostic and trouble-shooting functions to be automated, thereby reducing the need for large maintenance staffs to generate trouble tickets. Moreover, automatic generation of trouble tickets greatly facilitates and streamlines the diagnostic and repair functions of a network, thereby allowing the network to be run more cost-effectively. Additionally, allowing users and customers of the network access to the trouble tickets through a network to view their status will free network repair and diagnosis personnel from having to deal directly with disgruntled customers. These advantageous results have not heretofore been achieved in the art.

These and other features, objects and benefits of the invention will be best understood by those skilled in the art by reading the following detailed description of the invention in conjunction with the drawings which are first described briefly below.

BRIEF DESCRIPTION OF THE DRAWINGS

In the drawings wherein like reference numerals refer to like elements throughout the several views hereof:

FIG. 3 is a block diagram of a system to automatically generate trouble tickets in accordance with the present invention.

DETAILED DESCRIPTION OF THE PREFERRED EMBODIMENTS

Figure 1:
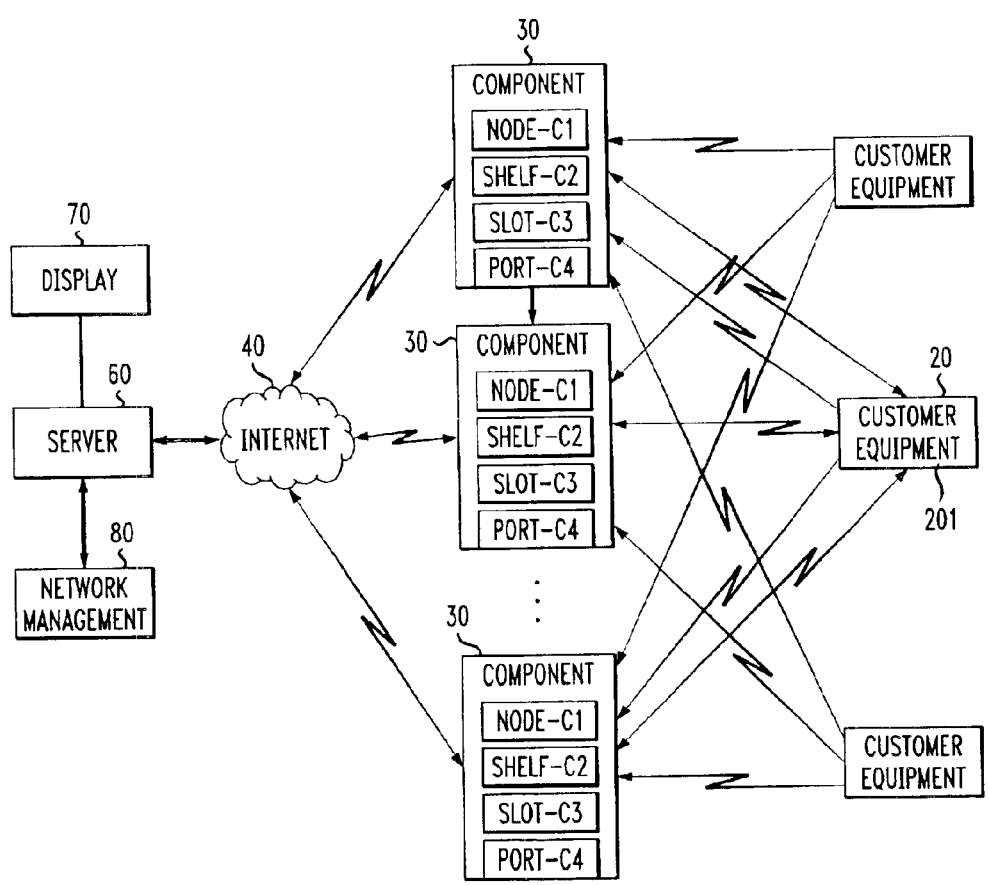
FIG. 1 is a block diagram of a telecommunications network comprising network elements having components therein that may fail.

Referring now to FIG. 1, a network 10 provides network services to customers which utilize various types of customer equipment 20 through a plurality of network elements 30 such as switches, routers, servers and other electronic devices. For example, network element 30 might be an Internet Protocol (P) router which could fail and interrupt service to the user 20. It will be appreciated that customers may utilize multiple pieces of equipment which may terminate on multiple components in the network elements 30, such as, for example, in a meshed network.

It is preferable in accordance with the invention to sectionalize the network elements 30 into their basic components in order to diagnose and quantify the failure(s) more accurately and at the appropriate places in the network elements 30. In the case of an IP router, the router can be sectionalized into a node, C1, a shelf, C2, a slot, C3, and a port, C4, all of which contain electronic parts that may fail. A network failure may be ticketed in accordance with the invention on any one or all of these basic components of the router. Other network elements may be similarly sectionalized as will be appreciated by those with skill in the art.

Those with skill in the art will also appreciate that communications through network 10 will occur through a medium 40, for example, the Internet. However, other media may also be utilized for communications for example broadband networks, LANs, WANs, Intranets, and all other networks that are adapted to carry data. Network management functions 50 will generate trouble tickets as described herein below and will communicate with the Internet 40 through a server 60. In one important aspect of the invention, the trouble tickets can be entered onto server 60 and accessed to be viewed or for display 70 either by the network management personnel, or by customers 20.

Figure 2:
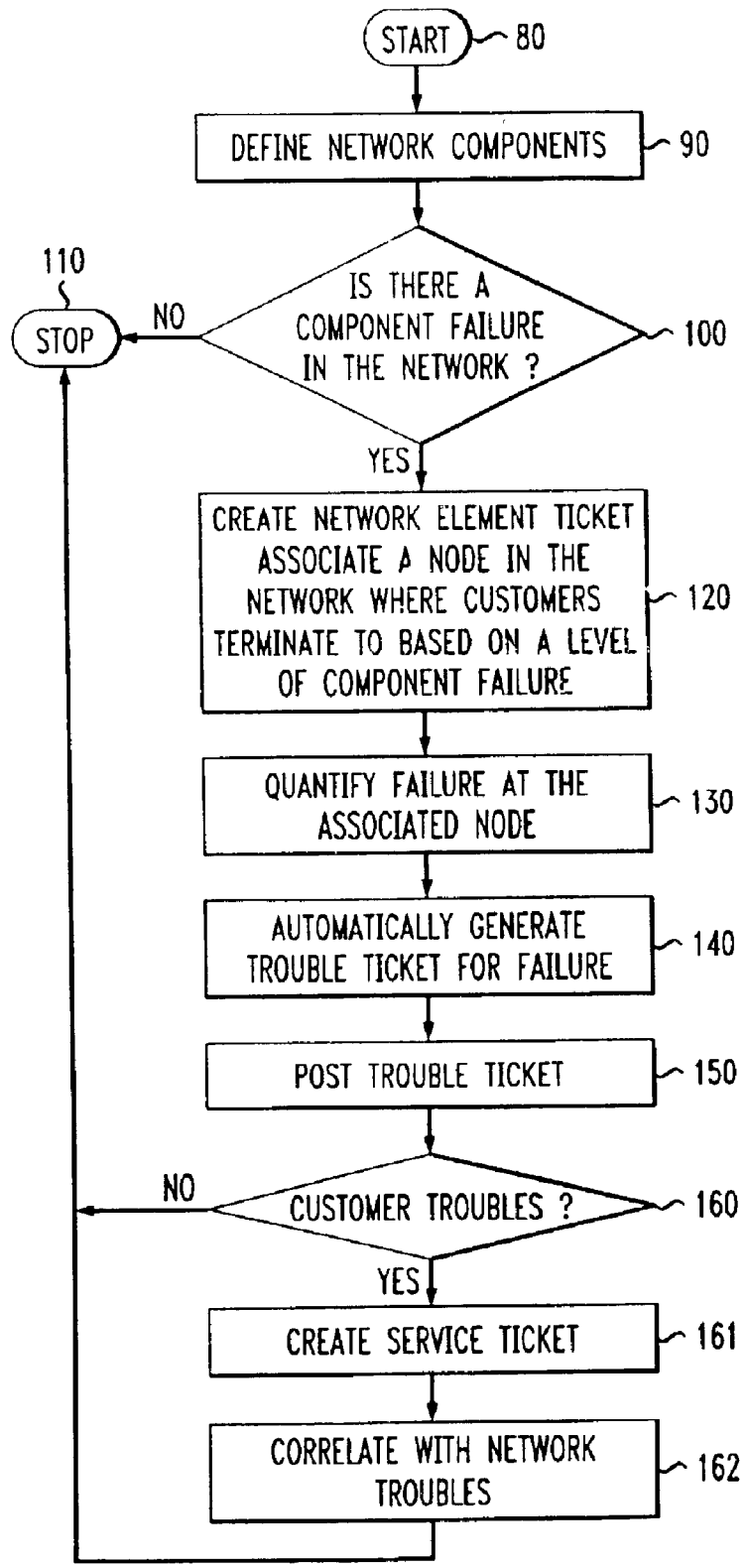
FIG. 2 is a flow diagram of the methods of the present invention.

The methods of the present invention will preferably be run on server 60 after the methods have been programmed in software, for example rule based software. The methods can be programmed in any appropriate software language, for example, UNIX, C++, JAVA, HTML, VISUALBASIC, or other high-order, preferably object-oriented, language. Regardless of which software language is chosen to design and implement the methods of the present invention, FIG. 2 is an exemplary flow chart of such methods.

The method starts at step 80, and at step 90 the network elements are defined as a function of the basic components of the elements so that the failure of the elements can be quantified at the basic component levels of the elements. It is then determined at step 100 whether there is a component failure in any of elements in the network. If not, then there is no need to automatically generate a trouble ticket and the method stops at step 110. However, if there has been a component failure of a network element in the network, then at step 120 a node in the network at which the customer terminates is associated with the network failure, and a network element ticket associated with that failure is created. Preferably, the association is based on the level of the component failure in the network element This will automatically allow an accurate trouble ticket to be generated.

It is then desired at step 130 to quantify the failure at the associated node. Thus, for example, if the port C4 on the router has failed, this is communicated to the network manager for diagnosis and repair. At step 140, a trouble ticket is then automatically generated based on the information derived from the quantification of the failure and the trouble ticket is posted at step 150 for display, access, or to be acted upon for other functions. It is then determined at step 152 whether any customer problems on the network exist. If not, the method then stops at step 10. If so, then at step 154 a service ticket is created associated with the customer problems and at step 156, the service ticket is correlated with the network problems. Then method would then end at step 110.

Trouble ticket generation in accordance with the present invention may occur in several modes. In a preferred embodiment, FIG. 3 illustrates the actual generation of the trouble ticket to implement a maintenance solution. Once the failure of the network element has been detected, a network care function 160 is invoked to create an element ticket which tells which of the network elements are experiencing failure(s), or otherwise documents the problem through creation of a trouble ticket preferably by a rules-based software engine. This results in the creation of an element trouble ticket 170 which, in turn, prompts creation of service trouble tickets 180 for all of the affected circuits that are experiencing the failure(s). In this fashion, all of the information in the element trouble ticket 170 flows to the service trouble tickets 180 so that the information is preserved, and ultimately acted upon, for all of the affected circuits.

Once the service trouble tickets 180 have been generated, an e-maintenance customer function is invoked at step 190 which can then open the service trouble tickets 180 at any time, regardless of when and how they have been initiated, and which allow maintenance personnel to diagnose the problems with, and/or begin a repair operation, of the affected network element. Moreover, the e-maintenance function will preferably have the ability to create an unrelated service ticket on the same circuit if necessary, for example, if another problem on the circuit is discovered or if other status with the affected circuit must be checked or repaired. More preferably, simultaneously with the invocation of the e-maintenance function 190, an IP customer care function 200 is invoked. The IP customer care function 200 has created for it automatically a service ticket which allows IP customer care function 200 to provide the status of the affected circuit to customers 20 if customers 20 contact the network to determine the nature of the failure and the actions which may be taken to remedy the failure. In a still further preferred embodiment, the IP customer care function 200 may enter comments to the service tickets automatically created for it which may then be used to update the customers 20 on the status of the failure and the repair of the failure.

The methods of the present invention improve network maintenance repair and response time to failures since the auto-creation of trouble tickets in accordance with the invention is accomplished much closer to the actual time of the failure. The present methods also give customers the advantage of viewing status on trouble tickets which have been created already, thereby eliminating the need for many of the customers to create their own trouble tickets. The inventive methods allow the manual creation of trouble tickets on the same IP address/circuit if the trouble is unrelated to that circuit and proactively communicate trouble and circuit failures to IP customer care centers and e-maintenance functions. This eliminates the need for the creation of working, individual service tickets, thereby greatly increasing the efficiency of network maintenance staff. Moreover, outage information for customers is more efficiently captured regardless of whether the outages and/or failure(s) have been called in by customers or not. These results have not heretofore been achieved in the art.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

What is claimed is:

1. A method of documenting a failure in a telecommunications network, comprising the steps of:

defining a component structure for elements in the network, wherein the defining step comprises the step of sectionalizing the elements into their basic component structures to quantify failures of the elements at a level of the component structures, and wherein the sectionalizing step comprises the step of sectionalizing the elements into a plurality of levels corresponding to parts in the network elements;

determining if any of the component structures are in failure in the network;

associating, based on the determined failure of at least one of the component structures, a customer circuit terminating on a node wherein the component structure is in failure; and automatically generating a trouble ticket based on the associated failed network component with the node, wherein the generating step comprises the step of generating an element trouble ticket which documents a failure of an element in the network; and generating a service trouble ticket in response to the generation of the element trouble ticket which documents all circuits in the network that are experiencing failure as a result of the failure of the network element.

2. The method recited in claim 1, wherein the step of generating a service trouble ticket generates a plurality of service trouble tickets, each of the service trouble tickets documenting a failure of a separate circuit in the network which results from the network element failure.

3. The method recited in claim 2, further comprising the step of invoking a maintenance function in response to at least one of the generated service trouble tickets, the maintenance function operable for diagnosing the failure of the network element.

4. The method recited in claim 3, further comprising the step of invoking a customer care function for providing to a customer a status of a circuit affected by the network element failure.

5. The method recited in claim 4, wherein the invoking of the customer care function step comprises the step of entering comments to service tickets automatically to update customers concerning status of the network failures.

6. The method recited in claim 5, further comprising the step of making available the trouble tickets over a medium to a customer.

7. The method recited in claim 6, wherein the medium comprises the Internet.

* * * * *